United States Patent Office 3,567,530
Patented Mar. 2, 1971

3,567,530
POLYMERIC PROPELLANT COMPOSITION CONTAINING LITHIUM PERCHLORATE/AMMONIUM PERCHLORATE EUTECTICS
Robert I. Lait, Swampscott, Stanley F. Bedell, Andover, and Lucius G. Gilman, Wakefield, Mass., assignors to Monsanto Research Corporation, St. Louis, Mo.
No Drawing. Filed July 2, 1962, Ser. No. 207,468
Int. Cl. C06d 5/00
U.S. Cl. 149—76       19 Claims This invention relates to perchlorates, and more particularly, provides novel polymeric solid solutions of a perchlorate wherein the polymer and perchlorate are combined in the same homogeneous phase, and novel methods of making the same.

Conventional composite solid propellant compositions generally consist of an inorganic oxidant and a plastic binder, which also serves as the reductant-fuel to the system. The aforesaid system is a heterogeneous composition wherein the burning rate and stability to detonation are dependent to some extent upon the particle size of the oxidant. Burning rate is improved as the particle size of the oxidant is reduced, but milling to provide a finely divided oxidant is hazardous and periodic explosions are encountered.

Dissolving the oxidant in the binder provides the oxidant in a state of subdivision finer than any grinding can produce, and avoids the hazards of milling.

Putting the oxidant into the same phase as the binder also raises the available solids loading of the composition. There is a limit to the solids loading for a given amount of binder, above which not enough binder will be available to form a continuous phase binding the discontinuous solids phase into a unitary structure. In the conventional composite propellant, the solids phase includes oxidant for the binder. To the extent that the binder phase includes oxidant for itself, available solids loading is freed for inclusion of other energetic components.

A variety of polymeric materials have been discovered which form polymeric solid solutions of lithium perchlorate, wherein the polymer and perchlorate are combined in the same homogeneous phase. It has further been found that polymeric solid solutions of ammonium perchlorate, wheren the polymer and perchlorate are combined in the same homogeneous phase, can also be formed. However, the solubility of ammonium perchlorate is considerably less than that of lithium perchlorate in the monomers.

Lithium perchlorate has certain advantages as the oxidizer for a propellant. It has the highest oxygen content per weight of all the perchlorate oxidants. On the other hand, ammonium perchlorate also has advantages: it is a cheap oxidant, one that is very commonly used, and it forms decomposition products which are totally gaseous, rather than partially solid.

It is an object of this invention to provide improved polymeric solid solutions of oxidants and methods of preparing the same.

A particular object of this invention is to provide novel polymeric solutions of perchlorate oxidant wherein the polymer and perchlorate are combined in the same homogeneous phase in which especially high concentrations of perchlorate are in solution in the polymeric binder.

A further object of this invention is to provide novel methods of making the stated polymeric solid solutions.

Still another object is to provide novel polymeric solid solutions of perchlrate combining the advantages of lithium perchlorate and of ammonium perchlorate.

These and other objects will become evident upon consideration of the following specification and claims.

It has been found that the eutectic of lithium perchlorate and amomnium perchlorate exhibits unexpectedly high solubility in polymerizable monomer systems and that the monomers can be polymerized in the presence of the dissolved eutectic to provide polymeric solid solutions wherein a polymer and perchlorate are combined in the same homogeneous phase.

The products provided by this invention contain advantageously high percentages of dissolved perchlorate. Lithium perchlorate will dissolved in polymeric binders to an extent providing more oxygen than the oxidant requirements of the polymeric binder. This excess oxidant can then be used to raise the specific impulse of these compositions by inclusions of additional oxidizable energetic propellant components such as a combustible light metal. The presently employed eutectic will dissolve in polymeric binders in an amount considerably greater than the solubility of lithium perchlorate alone permits, so that the products of the present invention can contain very high percentages of dissolved oxidant which is available for the oxidation of energy sources besides the polymeric binder. In addition, these products combine the benefits of the two several kinds of perchlorates which they comprise: high oxygen content for a given weight, as respects the lithium perchlorate, and fully gaseous combustion products, for the ammonium salt.

The solubility of the eutectic is surprisingly high. The eutectic is the fused material obtained by combination of the individual perchlorates in a melt in the eutectic ratio. A gross physical mixture of the eutectic components, lithium perchlorate and ammonium perchlorate, in the eutectic proportions is not nearly as soluble as the eutectic. The sum of the solubilities of the individual perchlorates is even less than this value: for example, in trimethylenediamine as solvent, solubility in grams per 100 grams solvent is $NH_4ClO_4$     200

$LiClO_4$        450 physical mixture (eutectic proportions) $\dfrac{LiClO_4}{NH_4ClO_4}\left(\dfrac{69.5 \text{ mole}\%}{30.5 \text{ mole}\%}\right)$   900 true eutectic $\dfrac{LiClO_4}{NH_4ClO_4}\left(\dfrac{69.5 \text{ mole}\%}{30.5 \text{ mole}\%}\right)$   1300

Since the eutectic is soluble in the polymerizable monomer systems from which the presently provided polymeric solid solutions can be made, advantageous methods of preparing these products are provided by this invention which comprise polymerization of polymerizable monomers in the presence of dissolved lithium perchlorate/ammonium perchlorate eutectic. The present invention is not limited, however, in the products it provides to those prepared by the novel method stated above, since these products can also be prepared if desired by other methods such as solution of the perchlorate eutectic in a melt or solution of the polymer. The method presently provided of polymerizing in the presence of dissolved perchlorate eutectic is, however, advantageously easily practiced.

The lithium perchlorate/ammonium perchlorate eutectic employed in practicing this invention, hereinafter referred to briefly as the perchlorate eutectic, can be prepared simply by heating a mixture of ammonium perchlorate and lithium perchlorate in a ratio calculated to approximate the eutectic ratio at a temperature above the melting point of the eutectic such as between 175 and 200° C. From the phase diagram of lithium perchlorate and ammonium perchlorate, it will be found that the eutectic composition contains 32.64 weight percent of ammonium perchlorate, remainder lithium perchlorate (69.5 mole-percent $LiClO_4$-30.5 mole-percent $NH_4ClO_4$). In preparing the eutectic, it is frequently advantageous to employ a slight excess of ammonium perchlorate in the fusion mixture, since some ammonium perchlorate decomposition can occur during the eutectic formation at 175–185° C. and the excess compensates for this loss. As little as an 0.5% deviation from the eutectic ratio observably decreases the solubility, and with greater deviations, it is observed that the ammonium perchlorate may come almost entirely out of solution.

The perchlorate must be anhydrous, containing less than about 0.5 mole-percent water, and in references to it, it is to be understood that anhydrous perchlorate is meant.

The polymer component of the presently provided novel products will be characterized by repetitive units including a hetero atom (an atom other than carbon) characterized by an unshared pair of electrons, such as O, S and N. Groups combining these hetero atoms, such as carbonamide groups occurring as side chains on repetitive units in the polymer or as bonds linking the repetitive units of the polymer unit, have been found especially beneficial, but the invention is not limited thereto. For example, one kind of presently preferred polymer has an amine nitrogen atom linking the repetitive units in the polymer and hydroxyl groups in the polymer side chains. An appreciation of the various specific types of polymers which are presently useful will be obtained from the discussion of methods for preparing the present products below.

The products of this invention, whether prepared by polymerizing in the presence of dissolved perchlorate eutectic or by dissolving perchlorate eutectic in preformed polymer, comprise polymeric solid solutions of the perchlorate eutectic and polymer in the same homogeneous phase.

By solid solution is meant that the perchlorate and the polymer are homogeneously mixed and in the same phase, to the extent that heterogeneity therebetween is not evident on examination under an ocular microscope.

By a polymeric binder is meant a matrix comprising polymer having a molecular weight at least sufficient to make the polymer solid at room temperature. It is undesirable to have the molecular weight so high that the polymer is infusible and insoluble. Preferably, the ultimate product will be sufficiently elastomeric to have a tensile strength of at least 50 pounds per square inch (p.s.i.) and ultimate elongation (at break) of at least 20%.

By an oxidant amount of the perchlorate is meant enough to supply the combustion oxidation requirements of a significant portion, which will be at least about half the oxidation requirements, of the polymer. Generally lithium perchlorate decomposes to LiCl, supplying two moles of oxygen per mole of the perchlorate. Ammonium perchlorate decomposition provides about 1 or 1¼ moles of oxygen per mole of perchlorate, the exact figure depending on its mode of decomposition, which may vary with the fuel system used. Referring for example to oxidation of polymers including $CH_2$ and like hydrocarbon units if the C atom forms CO and the hydrogen atoms form water, respectively, as gaseous oxidation products, the consumption of oxygen is one mole per mole of methylene units so oxidized. Under certain conditions, the hydrogen is not oxidized, or oxidized only in part, but then a corresponding amount of metal is oxidized, and the oxygen consumption is not lowered. Thus the ratio of perchlorate to polymer to supply the oxidation requirements will be at least about enough to supply one mole of oxygen per mole of reduced carbon atoms in the polymer. To attain the benefits of this invention, at least half of this consumption requirement is supplied by dissolved perchlorate eutectic in the same homogeneous phase as the polymer.

Preferably, all the oxygen requirement for oxidation of the polymer is supplied by dissolved perchlorate eutectic and still more preferably, more than half and desirably all the oxygen requirement of the total composition is supplied by such perchlorate.

The present compositions may consist essentially or entirely of the polymer and perchlorate eutectic. Such compositions are monopropellants which can be employed as such to produce propellant gases for rockets and the like by burning and explosive forces on ignition in an enclosed space.

As will appear hereinafter, however, it is desirable to include other components in the composition. These may either be part of the same binder phase as the polymer, or part of the discontinuous solids phase combined with the binder. These may include fuels and oxidants, as further pointed out hereinafter. If these other components are fuels, they consume oxygen, and thus increase the total oxygen requirements of the composition. Where additional oxidant is included, the perchlorate eutectic need not supply all the oxidant requirements of the composition, but to adapt the composition for propellant and fuel use, it is necessary that the composition include sufficient total oxidant to render combustion of the system self-supporting.

The quantity of perchlorate eutectic desired in the final solid propellant composition will thus vary depending on the particular selection of ingredients, and may be up to from about 70 to about 80 percent of perchlorate eutectic based on the total weight of the composition. It will be understood that substantially smaller amounts of the perchlorate eutectic may be employed in effective compositions, and the amounts are often in the region of from about 4 or 5% to about 15 or 16%.

In conducting the method of invention, perchlorate eutectic will be dissolved in a polymerizable monomer system. Useful polymerization systems in the present method are each characterized by formation of polymer from monomer in the absence of water. Water unfavorably depresses the solubility of the perchlorate.

The several types of polymerization systems which are particularly contemplated herein can be briefly described as (1) addition polymerization: (2) condensation polymerization of two reactive polyfunctional monomers: (3) self-condensation of a single monomer. In each case the useful monomers are characterized by inclusion of a hetero donor atom such as O, S, or N.

The addition polymerization embodiment of this invention employs as the polymerizable monomer on olefin containing a hetero donor atom selected from O, S and N. Polymers containing carbonamide groups are preferred as the polymeric binder in the compositions of this invention, and accordingly a preferred olefin type is an olefinic carbonamide. For example, they may be polymers of acrylamide, of C-alkylated acrylamides such as methacrylamide, or N-alkylated and C- and N-alkylated acrylamides such as N-methylacrylamide, N-tert-butylacrylamide, N-tert-octylacrylamide, N, N-dimethylacrylamide, N, N-dipropylacrylamide, N-octylmethacrylamide, N-decylmethacrylamide and the like.

They also may be polymers of cyclic amides including polymerizable olefinic unsaturation, the polymers of which are formed by addition polymerization, such as 1 - vinyl - 2 - pyrrolidinone, 3 - methyl - 1 - vinyl - 2-pyrrolidinone, and the like.

They also may be polymers of other olefinic amides, such as 3-butenoic amide.

Still another group of polymers which may form the polymeric component of the present novel products are those made by addition polymerization of an olefinic amide having in a side chain a substituent including a hetero atom (polyvalent atom other than C) selected from the group consisting of O, S and N. References herein to "an" acrylamide are intended to include both those in which the only non-hydrocarbon component is the carbonamide side chain group and those including hetero atoms of the type just stated. Illustrative of such amides are, for example, oxy compounds including hydroxy amides such as N-methyloacrylamide, N-(2-hydroxyethyl)-acrylamide, 2-methylolacrylamide and the like and ether amides such as N-acrylylmorpholine, N-methacrylylmorpholine and N - (2 - ethoxyethyl) - acrylamide and so forth. The S-containing amides may be illustrated by N-(mercaptomethyl)acrylamide, 2-(2-ethylthioethyl) acrylamide and N-(tetrahydrothienyl) acrylamide. Illustrative of the N-containing amides are acrylic hydrazide, N-acrylylpiperazine, 2-(aminomethyl)acrylamide, 1-cyanoacrylamide, N-(trinitroethyl)acrylamide and the like.

The polymers in products of this invention can also be obtained from olefinic monomers susceptible to addition polymerization which are free of carbonamide bonds. Those containing O are illustrated by ethers, such as 1-methoxybutadiene polymers; by polymers containing OH groups such as polymers of allyl alcohol; and by polymers derived from a olefin containing both O and OH such as vinyloxyethanol. Analogous sulfur compounds such as vinyl methyl sulfide may also be used in this connection.

Another group containing O which may characterize presently useful polymers is oxo (rather than the oxy- groups shown above. For example, this may be keto, as in methyl vinyl ketone.

Even more desirably, it will be a carboxylate group such as an ester group. Useful esters include as a first class the polymers of olefinic esters. Either the alcohol or the acid portion may be the olefinic group. Illustrative esters include those in which the acid portion of the molecule is unsaturated such as acrylates like methyl acrylate, tert-butyl acrylate, hexyl acrylate, and decyl acrylate, methacrylates such as methyl methacrylate, ethyl methacrylate, N-butyl methacrylate and the like. Illustrative of some esters in which the alcohol-derived portion of the molecule is unsaturated are allyl esters such as allyl acetate, and vinyl esters such as vinyl formate, vinyl acetate and vinyl stearate.

Referring to the N-containing polymers, those wherein N is amine nitrogen are illustrated by polymers of vinylpyridine. Acrylonitrile provides a polymer illustrating the type wherein the donor N atom in in a cyano group.

There is no objection to combining several characterizing groups in a single molecule providing the repeating unit in a polymer as contemplated hereby, and indeed, this may be particularly advantageous. For example, polymers of esters of O-containing alcohols may provide both oxy and oxo oxygen, such as 2-methoxyethyl acrylate, 2-methoxyethyl methacrylate, ethylene glycol dimethacrylate ester of a polyethylene glycol containing, say, nine ethyleneoxy units, and so forth. Or the alcohol may contain amino N such as butylaminoethyl methacrylate, N,N-dimethylaminoethyl and the like.

Mixtures of monomeric compounds such as those above mentioned may have solvent power for perchlorate which is substantially greater than either of the compounds alone. Thus useful mixtures of such vinyl monomers include for example allylamine-acrylamide, acrylamide-maleic anhydride, acrylamide-2-methoxyethyl acrylate, acrylamide - vinyloxyethanol, acrylamide - acrylonitrile, acrylamide-allyl acetate, acrylamide-vinyl formate and so forth. Generally, mixtures in the ratio of about 1:1 mole are found advantageous, but other proportions of the vinylic monomers may be employed if desired. It is to be understood that a copolymer is to be regarded as a polymer of a particular monomer if it contains enough of the monomer to confer characteristics of the homopolymer on the copolymer: for example, reference to a polyacrylamide herein are intended to include copolymers in which at least 30 mole-percent of polymerized olefinic monomer is acrylamide.

Especially where the selected monomer is an N-alkylated acrylamide, which does not cross-link in polymerization as does acrylamide, it is sometimes advantageous to include a small proportion of a cross-linking monomer such as acrylamide or methylene diacrylamide in the mix. Proportions such as from 0.01 to 0.10 mole of the cross-linking monomer to 1.0 mole of the non-cross-linking monomer are useful in this connection, to improve toughness and the like.

Polymerization of an olefinic monomer in the presence of dissolved perchlorate eutectic in accordance with this invention may or may not require more than simple heating of the olefinic monomer in the presence of the dissolved perchlorate eutectic. In some cases, the perchlorate eutectic may act as a polymerization catalyst. Indeed, when an oxidant amount of the perchlorate eutectic is dissolved in the olefinic monomer system, as contemplated herein, it is possible that the catalytic effect of the perchlorate eutectic on the polymerization monomer may be greater than desired; the polymer may set up before the mass can be poured and shaped. Various other components of the solution comprising the vinyl monomer and the perchlorate eutectic can also affect its polymerization. For example, an amine may inhibit it. However, while cationic catalysts such as the perchlorate may not be able to effect polymerization in the presence of an amine, free radical polymerization of the olefins generally occurs readily. Thus addition of free radical polymerization catalysts such as benzyl peroxide, cumene hydroperoxide, diazo isobutyronitrile and the like may be used to produce polymerization.

Another useful approach to effecting the polymerization where a monomer polymerized by the catalytic effect of the perchlorate eutectic is employed is to include a polymerization inhibitor such as an amine in the reaction mixture, and after accomplishing solution of the lithium perchlorate in the monomer containing mixture and through mixture of the components, quickly mix in a reagent which neutralizes the inhibitor, cast or extrude to shape and allow polymerization to a solid to occur.

The essential components of the polymerization mixture are the dissolved perchlorate, the olefinic monomer having a donor atom selected from O, S and N and also catalyst where the perchlorate is not itself the catalyst. As will become evident hereinafter, the mix may also contain other components, and conditions for polymerization may be varied depending on what these are. In general, polymerization may be effected at temperatures ranging from 0° C. and below up to any temperature below decomposition temperatures of reaction mixture components. Where heating does not have to be avoided because of the presence of sensitive ingredients, it is usually desirable to heat the reaction mixture to promote fluidity of the mix and solubility of the perchlorate. An advantage of the present method is that it is usually possible to effect polymerization at conveniently rapid rates while staying at relatively low temperatures such as between 50° C. and 100° C.

Usually polymerization is effected simply by maintaining the monomer in contact with active catalyst at suitable temperatures. If desired, variation of pressure from atmospheric—for example, down to 0.1 mm. Hg, or up to 5000 p.s.i.—may be employed. Solvents and diluents, such as plasticizers and the like, discussed in more detail below, may be present.

Proceeding now to consideration of the second type of polymerization useful in the method of this invention, this consists in forming a condensation polymer by polymerizing a first polyfunctional monomer with a second polyfunctional monomer reactive therewith to form a polymer without evolution of water, in the presence of dissolved perchlorate eutectic.

The stated first polyfunctional monomer will have active hydrogen functional groups. These monomers include polyhydroxylic alcohols, polyamines, and amino alcohols. It is found that such active hydrogen polyfunctional compounds, and particularly the polyamines, have a quite spectacular solvent power for lithium perchlorate/ammonium perchlorate eutectic. For example, trimethylenediamine will dissolve 13 times its own weight of the eutectic. Further, these active hydrogen polyfunctional compounds can be polymerized in the presence of dissolved perchlorate eutectic by condensation with other polyfunctional monomers to form the polymeric solid solutions of the perchlorate eutectic wherein the polymer and the perchlorate are combined in the same homogeneous phase.

A preferred type of polymers in the novel products of this invention which can be made by this embodiment of the method of the invention, are polymers in which the repeating units are carbon atom chains linked by complex amidic groups as bonds therebetween. The stated carbon atom chains will in many cases be hydrocarbon chains, such as alkylene and arylene units, but are not limited thereto; they may be substituted by non-interfering substituents, or interrupted by hetero atoms such as O, S or the like. The invention includes, for example, products in which the polymer is a polyurethane, polyurea, a polyester/amide and the like.

Of presently useful active hydrogen polyfunctional monomers, the polyhydroxylic alcohols are illustrated by ethylene glycol, trimethylene glycol, tetramethylene glycol, pentamethylene glycol, hexamethylene glycol, heptamethylene glycol, octamethylene glycol, nonamethylene glycol, decamethylene glycol, dodecamethylene glycol, neopentyl glycol, glycerol, pentaerythritol, 2,5-hexanediol, and the like which preferably contain up to about 12 carbon atoms. Also polyether glycols such as the polyethylene glycols, polypropylene glycols and the polybutylene glycols have been found to be suitable solvents for the lithium perchlorate. The lower members of the series are generally preferred, but polyether glycols having a molecular weight of up to about 9000 have been found to be suitable. As will appear hereinafter, hetero atoms besides ether oxygen, including for example imino nitrogen may also interrupt the carbon chain in the useful polyhydroxy compounds.

In general, the useful polyhydric alcohols are aliphatic alkanols, and usually will comprise a diol in major proportions, to obviate the high degree of cross-linking produced by triols and higher functional alcohols. It is preferred that the polyhydroxy compounds be polyfunctional primary glycols, but secondary and tertiary glycols have also been found to be suitable.

Presently useful polyamines are also preferably aliphatic diamines such as ethylenediamine, trimethylene diamine, tetramethylenediamine, hexamethylenediamine, pentamethylenediamine, octamethylenediamine, decamethylenediamine, 3-methylhexamethylenediamine and the like. A primary amine group is apt to be active and it is sometimes desirable to employ amines having nitrogen substituents to moderate the vigor of the polymerization reaction. Thus for example a secondary amine such as N-methylethylenediamine, N-methyltrimethylene diamine, N-butylethylenediamine N,N'-dimethylhexamethylene diamine and the like may be employed as reactants. Aromatic, cycloaliphatic and like polyamines are also useful in the practice of this invention. For example, illustrative polyamines which may be employed in the present method include p-toylylene diamine, m-phenylenediamine, cyclohexylene diamine and the like.

Other examples of presently useful polyamines are those including hetero atoms in the polymer chain such as 2,2'-diaminoethyl ether and sulfide, the bis(glycine) ester of ethylene glycol, and so forth.

Generally diamines in which each nitrogen atom has active hydrogen as a substituent will tend to produce cross-linking, and thus compounds such as diethylene triamine and dipropylene triamine will be employed in minor amounts, in conjunction with diamines, in the practice of this invention.

The term polyamine is used herein as broadly inclusive of any of a variety of compounds containing two $NH_2$ groups. For example, these include hydrazine. The $NH_2$ group may be adjacent to a carbonyl group and such polyamines (formally, amides) may be employed as reactants in practicing the method of this invention. For example, lithium perchlorate exhibits substantial solubility in urea, thiourea, O-tolyl biguanide and the like. Other such polyamines which may be employed in practicing this invention include 1,3-bis(2-aminoethyl)urea, carbodihydrazide, and so forth.

Still another class of active hydrogen polyfunctional monomers which can be used in practicing the method of this invention comprises the amino alcohols.

By amino alcohols are meant alcohols containing reactive amine groups substituted by at least one hydrogen atom, preferably primary amino, and a hydroxyl function. Polyols containing tertiary nitrogen and even hindered secondary nitrogen will generally react essentially as hydroxy compounds, and thus nitrogen-containing polyols such as N-oleyl diethanolamine, mono(hydroxy ethyl) tri(hydroxypropyl) ethylenediamine, 1-(2-hydroxypropyl)-3-(2-hydroxyethyl)urea, 1,3-bis(2-hydroxyethyl)urea and the like are regarded for the present purposes as polyhydric alcohols.

Compounds classed as amino alcohols for the present purposes and useful in the practice of this invention are illustrated by ethanolamine, 3-aminopropanol, 3-aminobutanol, 4-aminobutanol, 2-hydroxy 2'-amino ethyl ether, the corresponding sulfide, and the like.

It is sometimes advantageous to reduce the activity of presently useful amines by quaternizing the nitrogen atom with an acid. References to amines as made herein are intended to include the corresponding acid salts. Preferably the acid employed for quaternization is one which will contribute to the energy content of the formulation, such as perchloric acid.

Proceeding now to a consideration of the second polyfunctional monomer, employed in the method of this invention to polymerize the active hydrogen polyfunctional monomer in the presence of dissolved perchlorate eutectic, it is important that the reaction by which these monomers form a polymer is not one evolving water as a byproduct. Water hydrates the lithium perchlorate and this affects its solubility unfavorably. For the present purposes, in practicing the method of the invention, monomers will be chosen which form a condensation polymer without evolution of water.

A first and preferred class of such second polyfunctional monomers are those which form the presently provided products in which the polymer is characterized by complex amidic bonds. Especially preferred among such polyfunctional monomers are the polyisocyanates.

Illustrative examples of suitable polyisocyanates are tetramethylene diisocyanate, pentamethylene diisocyanate, pentamethylene diisocyanate, hexamethylene diisocyanate, octamethylene diisocyanate, dodecamethylene diisocyanate, N-phenylene diisocyanate, tolylene-2,4-diisocyanate, tolylene-2,6-diisocyanate, 3,3'-bitolylene-4,4'-diisocyanate, naphthalene-1,5-diisocyanate, diphenylmethane-4,4'-diisocyanate and the like. It is preferable that the polyisocyanate contain less than about 20 carbon atoms.

As is known, reaction of a diisocyanate with a diol forms a polyurethane; reaction thereof with a diamine forms a polyurea; and reaction with an amino alcohol will form a polyurethane/polyurea. Each of these types of polymers includes complex amidic bonds in which the carbonamide group linking recurring units in the polymer chain is joined to a hetero atom which is O in the case of the urethane and N in the case of the urea bond.

An equivalent of the polyisocyanate, preferably used when the exotherm of the polymerization reaction with the issocyanate is unduly great, is a urethane made by reacting a polyisocyanate with a low molecular weight alcohol such as ethanol. The displacement of the alcohol group during polymerization releases the alcohol as a byproduct; this can be drawn off if desired (as by putting the reaction mixture under vacuum) or left in the polymer to serve as a plasticizer for the product. Illustrative of the urethanes which may be used for this purpose are those made by reacting an isocyanate such as those listed above with a low molecular weight alcohol such as ethanol, methanol, isopropanol and the like.

A second polyfunctional monomer which may be reacted with a diol, a diamine or amino alcohol to form the products comprising polymer having complex amidic bonds as provided by this invention are the bis-azlactones. These are cyclic compounds containing a

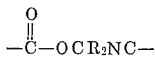

five-membered ring. The product of reaction with the polyfunctional active hydrogen monomer has a complex amidic bond which is a methylene dicarbonamide group

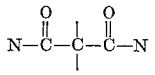

when an amine group combines with the azlactone residue, and a methylene carbonamide carboxylate group

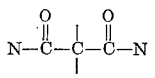

when a hydroxyl group is the reactant producing opening of the azlactone ring.

Illustrative of the presently useful azlactones are for example p-phenylene-bis(4,4-dimethyl-2-oxazolin-5-one), tolylene bis(4,4-dimethyl-2-oxazolin-5-one), cyclohexylene bis(4,4-dimethyl - 2 - oxazolin - 5 - one), phenylene bis(4,4-dimethyl - 2 - oxazolin-5-one), ethylene bis (4,4-dimethyl-2-oxazolin-5-one), phenylene bis(2-oxazolin-5-one) and the like.

The present embodiment of the method of this invention is also adapted for the production of a number of other polymeric solid solutions, in addition to the above-discussed polymers having complex amidic groups.

Thus for example, a bis-lactone or bis-lactam can be reacted with a polyhydroxy alcohol, polyamine or amino alcohol to form polyesters and polyamides. The lactone or lactam ring opens so that the hetero atom of the ring picks up hydrogen from the active hydrogen polyfunctional monomer and forms a side chain, as may be understood from the illustrative equation

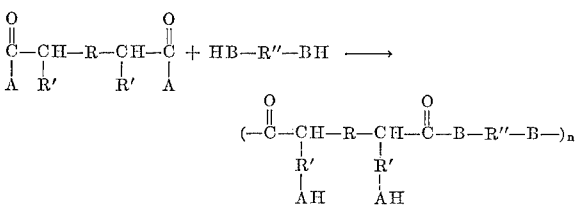

where A is O (lactone) or NH (lactam), B is O (hydroxyl) or NH (amine) and R, R' and R" are organic radicals such as aliphatic and aromatic hydrocarbon radicals, for example.

Illustrative of lactones which may be employed thus in the method of this invention are, for example, ethylenebis(butyrolactone), p-phenylenebis(butyrolactone), p-phenylenebis(2-methylbutyrolactone) and the like.

Illustrative of cyclic bislactams which can be used in practicing the method of this invention are p-phenylene bis(pyrrolidinone), ethylene bis(3-methylpyrrolidinone) and so forth.

Another kind of polyfunctional compound which can be used to polymerize the active hydrogen monomer without evolution of water is a polyepoxy compound. These are reactive particularly with the polyamines (in fact, so much so that a secondary amine group may be preferable to a primary), but are known to react with polyhydric alcohol groups also, in a polymer-forming reaction. When condensed with a polyamine, the polyepoxy compounds react somewhat like the bislactones and bislactams discussed above: the epoxy ring opens to form a hydroxy-terminated side chain and the amine group, minus a hydrogen atom, forms the bond linking the repetitive units of the polymer.

Poly-β-hydroxyamines prepared from a diamine and a diepoxide offer several advantages as solid solution propellant binders. In contrast to a diisocyanate, the diepoxide dissolves some of the oxidizer so that it is not necessary to dissolve all of the oxidizer in the diamine monomer. In addition, the polymer itself is a more powerful solvent for the oxidizer than the two monomers so some of the oxidizer will dissolve during curing.

Also, it is found that the dissolved perchlorate has a beneficial activating effect on the hardening of the epoxy by the amine compound. The epoxy compounds are well known. The general characteristic of this class of materials is the presence of epoxy groups, which are of the formula

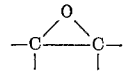

by the reaction of which the epoxy compound may be cured to give a solid, thermoset, resinous material. The polyepoxy compounds containing a plurality of terminal epoxy groups are frequently referred to as epoxy resins. Usually epoxy resins are of moderately high molecular weight, containing more than 10, and usually more than 20 carbon atoms per molecule.

Epoxy groups can be introduced into organic molecules, particularly cyclic organic compounds, by treatment of an aliphatic double bond with an appropriate oxidizing agent, or by reaction of a polyfunctional epoxy compound with a polyol, that is, a compound containing two or more hydroxy radicals, producing epoxy resins comprising one or more ether linkages joining organic radicals and terminating in epoxy groups.

One class of epoxy compounds useful in the process of this invention are the product of reaction of a polyfunctional epoxy compound with an aromatic polyhydric phenolic compound. The polyfunctional epoxy compound used in this connection may be a diepoxide, distinguished from the class of epoxy resins by its relatively low molecular weight, illustrative of which are diepoxybutadiene, bis(2,3 - epoxy - 2 - methylpropyl) ether and the like. More usually, the polyfunctional epoxy compound is a haloepoxy compound, most commonly, epichlorohydrin. Reaction of epichlorohydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkoxy radicals. The aromatic polyhydric compound may comprise a monocyclic phenol such as a resorcinol, a polycyclic phenol such as p,p'-(dihydroxy)-biphenyl, a phenolic resin such as phenol-formaldehyde resin, a bisphenol and the like.

Illustrative of bisphenols which may be employed to produce such polyepoxides are, for example:

p,p'-oxybisphenol,
p,p'-methylenebisphenol,
2,2-bis(4-hydroxyphenyl)propane,
2,2-bis(4-hydroxy-2-methylphenyl)propane,
2,2-bis(2-t-butyl-4-hydroxyphenyl)propane,
2,2-bis(2,5-dimethyl-4-hydroxyphenyl)propane,
2,2-bis(2-chloro-4-hydroxyphenyl)propane,
2,2-bis(2-bromo-6-fluoro-4-hydroxyphenyl)propane,
1,1-bis(4-hydroxyphenyl)ethane,
1,1-bis(4-hydroxyphenyl)isobutane,
1,1-bis(2-isopropyl-4-hydroxyphenyl)isobutane,
2,2-bis(4-hydroxyphenyl)butane,
4,4-bis(4-hydroxyphenyl)heptane,
1,1-bis(4-hydroxyphenyl)dodecane,
2,2-bis(4-hydroxyphenyl)hexadecane, and the like.

Another class of epoxy resins commercially available and useful in the present process comprises aliphatic epoxy resins. Compounds of this nature may, for example, be prepared by a process analogous to that employed in preparing an epoxy resin from a bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, sorbitol and the like. A compound of this nature may be represented by the formula

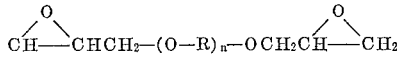

where R is an aliphatic group containing only C, H and O, and $n$ is an integer, including zero.

In general, aliphatic chains produce more flexible resins than aromatic, and mixed aliphatic and aromatic chains may alternatively be introduced into an epoxy resin, using the afore-described procedures, producing resins of modified properties.

As mentioned above, epoxidized cycloaliphatic compounds such as a diepoxide of ethylene glycol bisdihydrodicyclopentadienyl ether, are also comprised within the class of epoxy resins curable to thermoset resinous products.

These, and particularly the stated diepoxide, are a preferred class of epoxy resins for use in the practice of the present invention. Illustrative of other useful epoxidized cycloaliphatic resins are, for example, limonene diepoxide, dicyclopentadiene diepoxide, vinylcyclohexene diepoxide, 3,4-epoxy-6-methylcyclohexylmethyl 3,4-epoxy-6-methylcyclohexanecarboxylate, and the like.

Other feasible variations in epoxy resin structure will be known to the art. This invention contemplates the use of any of the variety of epoxy resins conventionally used in the industry for the production of resinous materials by curing processes.

It is frequently advantageous to employ hardeners in the epoxy systems, which lead to cross-linking of the polymer chains and consequent higher molecular weight. One method of accomplishing this is to include trifunctional monomers in the system. Thus for example, part of the diamine component may be replaced by a triamine such as diethylenetriamine, dipropylenetriamine, and the like. Another method of hardening the resin is to provide cross-linking through the hydroxy groups formed by ring opening of the epoxy groups. This may be effected, for example, by treatment with a polycarboxylic acid compound, which will esterify these hydroxy groups. Preferably an acid compound is used which will release a minimal amount of water on esterification, such as pyromellitic dianhydride, or maleic anhydride, fumaric anhydride, succinic anhydride and the like.

The polymerization method of this embodiment will comprise contacting the active hydrogen polyfunctional monomer with the polyfunctional monomer reactive therewith in the presence of an oxidant amount of dissolved perchlorate. In genral, the polymerization will be conducted by dissolving the perchlorate eutectic in one or both of the reactants, and then contacting them under conditions adapted to effect their reaction to form a polymer.

Usually the amounts of the respective monomers will be proportional to one another to supply one equivalent of the active hydrogen polyfunctional monomer about one equivalent of the second monomer reactive therewith.

By an equivalent is meant a mole divided by the number of functional groups in the monomer. Thus one mole of the active hydrogen monomer will be employed per mole of the second monomer reactive therewith where each are difunctional; where the active hydrogen monomer is tetrafunctional, one half mole of this will supply an equivalent per mole of a difunctional second monomer reactive therewith, and so forth.

Sometimes a slight excess of one or the other will advantageously be employed, to facilitate completion of the reaction.

Thus for example the polymerization of a dihydric alcohol and a diisocyanate is effected by preferably employing a slight molar excess of the diisocyanate sufficient to react with all of the hydroxyl groups, such as about 1.05 mole equivalents of diisocyanate per mole of a dihydric compound.

In general, polymerization may be effected at temperatures ranging from 0° C. and below up to any temperature below the decomposition temperatures of reaction mixture components. The polymerization of presently employed reactants to provide the condensation polymers can be accelerated by the application of heat, but in general the system should not be held at temperatures in excess of about 200° C. to preclude the dissociation of the polymer and the possible hazard of effecting an explosive oxidation of the system. Normally polymerization temperatures below about 150° C. will be sufficient for most reactants selected.

Usually polymerization is effected simply by maintaining the monomers, in the presence of dissloved perchlorate, in contact with one another at suitable temperatures. If desired variation of pressure from atmospheric—for example, down to 0.1 mm. Hg or up to 5000 p.s.i.—may be employed. Solvents and diluents, such as plasticizers and the like, discussed in more detail below, may be present. It is sometimes advantageous to employ a catalyst in connection with the practice of the present invention, to promote condensation of the monomers. Thus for example in reacting trimethylene diamine with hexamethylene diisocyanate to form a polyurea, ferric acetyl acetonate and similar coordination compounds of transition metals are useful as catalysts. The polymerization of a polyhydric compound with a diisocyanate can be favored by the presence of a base catalyst, as for example a tertiary amine such as triethylamine, N,N-diethylcyclohexylamine, N-methylmorpholine, pyridine and other base catalysts.

To provide a dense, substantially homogeneous polymer composition it is necessary to preclude the presence of agents in the polymerization system which would cause foam formation therein. Accordingly, where an isocyanate is employed as a reactant, the system should be maintained free from water. Also proper mixing means should be employed to preclude trapping air in the final polymer composition.

A third group of monomer systems which may be converted to polymeric solid solutions by polymerization in the presence of the perchlorate eutectic consists of self-condensing monomers which polymerize without evolution of water. There are various types of polymerizable monomers within this category. Thus for example, such monomers include the cyclic lactams of amino acids such as ε-caprolactam, 2-pyrrolidinone and the like. These can be polymerized in the presence of dissolved perchlorate for example by known low temperature, base-catalyzed, N,N-diacyl-initiated polymerization processes. Illustrative of such polymerization catalysts is a system comprising a catalytic amount of a dispersion of sodium hydride in mineral oil combined with N-acetyl caprolactam, a combination of N-acetyl caprolactam and phenyl magnesium bromide, and the like. Generally the base catalyst in the system, which is an alkyl or alkaline metal or its hydride, borohydride, or like active derivative is employed in an amount of about 0.05% up to about 5% and preferably 0.1% up to about 1% by weight of the lactam present in the composition, and the N,N-diacyl catalytic promoter is employed in conjunction therewith in an amount varying from about 0.1 to about 5 mole percent and preferably 0.1 to 1 mole percent of lactam monomer.

Another kind of self-condensing monomer which yields polymer without evolution of water as contemplated herein is a polyisocyanate. Heating a polyisocyanate in the presence of a catalyst of ionic polymerization forms a polyisocyanurate. The isocyanurate ring, which contains 3 N and 3 CO units symmetrically arranged, is the residue of one and a half diisocyanate monomer molecules. The polyisocyanurate can be made from a diisocyanate, or from the combination of a diisocyanate with a monoisocyanate. The latter combination promotes linearity of the polymer chain. Illustrative diisocyanates which may be employed in this connection include the diisocyanates listed above. Illustrative monoisocyanates are the corresponding aromatic and aliphatic isocyanates such as phenyl isocyanate, chlorophenyl isocyanate, methoxyphenyl isocyanate, n-hexyl isocyanate, and the like. The monoisocyanate may be present in any amount relative to the diisocyanate. About 40 mole percent to 100 mole percent of monoisocyanate based on diisocyanate is generally useful.

The polymerization reaction is conducted in liquid phase in the presence of a suitable solvent. To be effective for the present purposes, the solvent will be one in which the monomeric isocyanate is miscible or soluble and further, one in which the perchlorate eutectic is sufficiently soluble for the present purposes. Genrally, an oxidant amount of perchlorate must be soluble in the amount of solvent employed. This amount may vary over wide limits for the purposes of the present invention. Generally about 2 to 20, and preferably about 8 to 10 parts by weight of solvents per part of monomer starting material are employed. As will be appreciated, an isocyanate functional group is reactive with active hydrogen, such as the active hydrogen of alcohols and of amines. Therefore, to avoid diversion of the isocyanate to reaction with such materials, the solvent chosen should be characterized by substantial inertness towards the isocyanate radical. Solvents having on the one hand inertness towards isocyanate groups and on the other hand solvent power for perchlorate salts include as a particularly preferred class the amides in which the nitrogen atom is fully substituted. Especially preferred in this connection for use in practicing the present invention are for example N-dialkyl alkanecarbonamides such as dimethylformamide, dimethylacetamide, dibutylacetamide, diethylformamide, and the like. Similarly highly polar solvents free of reactive hydrogen such as dimethylsulfoxide can also be employed in this connection.

The polymerization reaction is catalyzed by means of a catalyst which induces ionic polymerization and may include a strong base of an organic or inorganic type as long as it does not affect adversely to any significant extent the desired product materials. The strong bases include, fo example, tertiary amines, which may be alkyl, aromatic or heterocyclic, such as triethylamine, pyridine, 1,4-diazabicyclo [2.2.2] octane, and the like; alkali or alkailne earth metal salts of low molecular weight carboxylic acids such as sodium carbonate, sodium acetate, potassium acetate, and the like; alkali metal alkoxides, such as sodium methoxide and potassium propoxide, organic tertiary phosphines, such as triethylphosphine, dimethylphenyl phosphine, and so forth.

The quantity of catalyst employed for the reaction may vary over wide limits, but in general about 1 to 50 mole percent, preferably about 1 to 5 mole percent of a strong base catalyst, such as the bicyclo compounds, or about 20 to 50 mole percent of a weak base catalyst such as triethylamine, based on monomer starting material, may be employed.

The catalysis of the polymerization reaction may be enhanced by the additional use of an organic epoxide. The organic epoxide is miscible and/or soluble with the diisocyanate monomer. The useful epoxides include aromatic and aliphatic compounds including, for example, epihalohydrins, such as epichlorohydrin; alkylene oxides such as propylene oxide and styrene oxide; alkenyl oxides such as butadiene mono- or dioxide, glycidyl esters such as ethyl glycidate, and so forth. Generally the presence of the epoxy group enhances catalysis, and the compound thereof is wholly or partly miscible or soluble with the monomer. The amount of organic epoxide employed with the ionic polymerization catalyst may vary considerably, but in general up to 100 mole percent, preferably about 5 to 10 mole percent of organic epoxide when using a strong base catalyst such as the bicyclo compounds, or preferably about 20 to 50 mole percent of organic epoxide when using a weak base catalyst such as triethylamine, may be used.

The polymerization temperature may vary from about ambient level to about 125° C. with the upper limit being determined by the fact that adverse effects tend to become noticeable above the same. Preferably, it is about 75–100° C. However, in some instances temperatures above 125° C. may be used. The temperature of reaction may vary with pressure, and atmospheric pressure is contemplated for the temperature range given above. If desired, the reaction may be conducted at subatmospreric or superatmospheric pressure, in which case the temperature may be varied outside the range herein given. The time required for the polymerization reaction to be substantialy completed may vary considerably depending upon the type of monomer employed and may take for example up to about two hours for substantial completion. The time of reaction is only important as far as the quantity of polymer is concerned. If desired, the reaction time may be shortened to suit the particular needs of a situation or for that matter lengthened, without departing from the scope of the present invention.

When the products of the invention are prepared by a method as described above, after polymerization is complete, it is sometimes advantageous to maintain the polymerized mass at temperatures above ambient temperature for a time, to effect complete cure or postcure of the mass.

While the above discussion refers to the method of polymerization in the presence of dissolved perchlorate eutectic, it is to be appreciated that this is not the exclusive method by which products as claimed herein may be produced. The scope of the present invention extends to polymeric solid solutions of the perchlorate eutectic prepared by forming the polymeric chain first and afterwards dissolving the perchlorate eutectic in the polymer. This can be done simply by heating and working the polymer in the presence of the perchlorate eutectic until it is fluid, as for example by blending it with the perchlorate in suitable mixers or extruders or on a roll mill or the like, at temperatures up to about 250° C., desirably but not necessarily in the presence of a solvent or diluent, which preferably will be a polymer plasticizer such as di-n-butyl phthalate.

The stated method of incorporating the perchlorate eutectic into polymer in solid solution therein is desirable in instances where the polymer-forming reaction proceeds with evolution of water. Thus for example polyamides may be formed by heating a dicarboxylic acid or acid anrydride with a diamine. The polymer chain is formed with accompanying evolution of water. This would be deleterious to the solubility of the eutectic. But if the polymer is formed first, the perchlorate eutectic can later be incorporated in it without difficulty.

Illustrative of condensation polymers which may be advantageously formed separately and subsequently combined with the eutectic to form the polymeric solid solutions of the invention are polyesters and polyamides. Thus for example a polyester may be obtained by condensing a diol such as ethylene glycol with a carboxylic acid such as adipic acid, either in the presence or the absence of modifiers such as maleic anhydride and styrene. Polyamides may be formed by condensing an acid such as adipic or succinic acid with polyamines such as trimethylene diamine or hexamethylene diamine. These and other methods of forming a polymer suitably adapted for the present purposes are well known to the art. Any polymer containing a donor atom such as O, S, or N in repeating units of the chain may be employed for this purpose.

However, the method of polymerizing in the presence of dissolved perchlorate eutectic, where applicable is usually preferable.

As the foregoing has indicated, compositions provided in accordance with this invention may consist essentially of a polymer of the kind stated above, and perchlorate eutectic in solid solution therein. Such compositions are useful as fuels and monopropellants: they will burn to form energetic gases or, if confined, burn explosively.

Desirably, however, additional components will be present in compositions embodying the present invention. Components which are particularly desirably present in such compositions comprise polymer-modifying additives such as plasticizers, and in this connection it has been found that unexpectedly large increases in solvent power can be achieved by selection of appropriate plasticizers.

Additives which can advantageously be incorporated in the compositions of this invention comprising homogeneous mixtures of polymer and perchlorate eutectic are the relatively low molecular weight plasticizers. One exemplary class of these are amides. These include, for example, the sulfonamides such as N-nonosubstituted toluene sulfonamides such as N-ethyl-p-toluenesulfonamide, N-ethyl-o-toluenesulfonamide, and mixtures thereof. Further it includes amides and hydrazides such as formamide, dimethylformamide, hydrazodicarbonamide and oxaldihydrazide.

Another group of useful plasticizers are glycol ethers such as triethyleneglycol dimethyl ether, ethylene glycol, glycerol and the like. In this group, ethylene glycol is found to exert a particularly favorable effect, used both alone and in combination with other plasticizers in the binder combination with other plasticizers in the binder compositions.

Another class of presently useful plasticizers are those which are better fuels than the ethylene glycol type. Such plasticizers having good fuel properties are characterized by the presence of nitro groups. Illustrative of such compounds are 5,5-dinitro-1,2-hexanediol, bis(2,2-dinitropropyl)formal, 5,5-dinitro-1,3-dioxane, tris(hydroxymethyl) nitro methane, and the like.

The fairly polar plasticizers preferably should also be solvents for the perchlorate eutectic such that components of the system are mutually soluble or dispersible to effect a homogeneous solid composition. The presence of the plasticizers may render the composition more rubbery and provide a material improvement in tensile elongation of the material.

The plasticizer employed will function as a fuel element in the composite solid propellant, and the ratio of perchlorate eutectic should be adjusted so that a proper balance is maintained between the oxidant and the fuel combinations to provide complete combustion.

The amount of plasticizer employed can vary up to about 35 weight percent of the polymer present in the composition but amounts of from about 15 to about 25 weight percent are generally preferred.

Also, the novel homogeneous, single-phase combinations of perchlorate eutectic with polymers provided by this invention can advantageously contain metal and hydride fuels. Thus for example, the propellant compositions may contain finely divided light metals and various hydrides thereof. Examples of these are beryllium, boron, magnesium, aluminum, magnesium hydride, aluminum hydride, the various solid hydrides, such as decaborane, alkylated decaboranes (ethyl alkylated decaborane), aluminum borohydride, lithium aluminum hydride, and the like. For example, the homogeneous mixture of lithium perchlorate and the polymer may contain up to about 20% by weight of the total composition of atomized aluminum (particle size about 20 microns). Preferably the aforesaid fuel material should be sufficiently fine to all pass a standard 100 mesh screen and more preferably should pass a 200 mesh screen.

These light metal hydride high energy additives should preferably not exceed about 25 weight percent of the total composition, since the heavy combustion exhaust tends to lower performance of the solid propellant composition. It is often desirable to incorporate not more than from 5 to about 10 weight percent of said additives based on the total weight of the propellant composition.

Another group of additives which may be included in the system as part of the solids phase comprises oxidants, and other readily decomposable materials such as explosives. Illustrative of useful oxidants are, for example, ammonium perchlorate, ammonium nitrate and the like. Illustrative of useful explosive components are, for example, sodium azide.

The amount of oxidant employed in the solids phase will be adjusted in accordance with the amount of fuel to be burned in the composition and the amount of dissolved oxidant already supplied by the binder. Energetic, gas-supplying decomposable materials not requiring oxidant will usually be employed in gas-deficient systems, and the amount thereof adjusted to supply gas volume sufficient to take up thermal energy available so as to maximize the specific impulse of the system.

Referring to use of the presently provided compositions, when these are polymerization cast directly in a rocket motor, they will generally exhibit adhesive properties, and thereby adhere in polymerization to the cylinder in which they are cast. Due to this adhesive quality, it may be desirable for a core insert to be employed to provide the desired internal cavity to effect proper radial burning of the propellant composition. This may be fabricated from or coated with a material such as polyethylene or polytetrafluoroethylene in order to provide ready release of the insert when polymerization is terminated.

The solid propellant may also be produced by extrusion for insertion in small bore rocket cases. In this case, a small amount of catalyzed liquid polymer composition can first be added to the cylinder case such that the insertion of the extruded mass will displace the liquid polymer, forcing it to rise in the annular space between the extrusion mass and the cylinder wall, whereby the inserted mass is securely bonded within the case. This liquid polymer can be of similar composition to the propellant composition insert, or any other suitable polymer composition which can be readily cured at suitable temperatures, below about 200° C., such as, for example, epoxy resins, polysulfide rubbers and the like.

The perchlorate eutectic polymeric compositions of this invention burn vigorously and relatively uniformly when ignited and are useful as a solid propellant for rockets including short range ballistic weapons such as aircraft and artillery rockets and long range strategic missiles, wherein they may be the sole propellant or be employed in one or more stages of a multi-stage rocket system. The aforesaid compositions are also useful for rocket assisted takeoff, as boosters, sustainers and as pyrotechnics. When confined the aforesaid compositions also are particularly valuable as explosives.

The invention is illustrated but not limited by the following examples in which all parts are by weight unless otherwise noted.

EXAMPLE 1

This example illustrates use of a lithium perchlorate/ammonium perchlorate eutectic in a propellant composition where the polymer is a polyurea.

547 parts of the lithium perchlorate/ammonium perchlorate eutectic are dissolved in 60 parts of trimethylenediamine, while the mixture is held on an oil bath at 85° C., and then 9.8 parts of ethylene glycol and 3 parts of ferric acetylacetonate are added, as plasticizer and catalyst, respectively. Now 136 parts of hexamethylene diisocyanate are introduced. In four hours a gummy product is obtained which is a polymeric solid solution of the perchlorate eutectic in a polyurea.

A solution is prepared of 130 parts of a mixture of lithium perchlorate and ammonium perchlorate, in a ratio of 69 to 31 by weight, in 10 parts of trimethylenediamine, at 85° C. The perchlorates remain dissolved when this solution is cooled to room temperature. Addition of the equivalent amount of tolylene diisocyanate produces polymerization to the corresponding polyurea at room temperature. The final composition consists to the extent of 81% of its weight of polymer and the perchlorate needed to burn the polymer to water, ½ $CO_2$ and ½ $CO$, while 19% consists of oxidizer available to burn other constituents added specifically as fuel.

EXAMPLE 2

This example illustrates the preparation of a polyurethane/polyurea solid solution of a lithium perchlorate/ammonium perchlorate eutectic.

153 parts of isopropanolamine perchlorate are mixed in a dry box with 463 parts of lithium perchlorate/ammonium perchlorate eutectic. Solution is incomplete, at 85–90° C.; at 100° C., a cloudy solution is obtained. Now 147 parts of hexamethylene diisocyanate are added and mixed in while the solution is held at 100° C. The samples (the experiment is run in triplicate) become viscous and tacky after less than one hour at 100° C. and on cooling to room temperature produce a hard product, apparently homogeneous in nature.

EXAMPLE 3

This example illustrates the preparation of a diamine/diepoxy polymer containing lithium perchlorate/ammonium perchlorate eutectic in solid solution.

A mixture of 33 parts of 3,4-epoxy-6-methylcyclohexylmethyl 3,4-epoxy-6-methylcyclohexanecarboxylate and 67 parts of the bis(epoxydicyclopentyl) ether of ethylene glycol is heated to 85° C., 23 parts of trimethylene diamine are added, and then 369 parts of lithium perchlorate/ammonium perchlorate eutectic are dissolved in the mix. Holding at 85° C. for 24 hours gives a hard polymeric solid solution of the perchlorate which burns well.

Similar results are obtained using a ratio of 25 parts of the first diepoxide to 75 parts of the second diepoxide. Similar results are obtained using 50 parts of each of the stated epoxides, 24 parts of trimethylene diamine, and 200 parts of lithium perchlorate/ammonium perchlorate eutectic. It is observed that the polymerization is accelerated when the perchlorate eutectic is added to the mixture.

When the above-stated procedure is repeated, except that the eutectic is added before the mixture is heated to 85° C., the mixture becomes very stiff within 5 to 10 minutes, and the product is about 95 percent polymerized within 3 hours. It is a uniform homogeneous mixture of about 40% polymer and 60% oxidant which burns well.

EXAMPLE 4

This example illustrates another preparation of a polymer from a diepoxide and diamine including dissolved lithium perchlorate/ammonium perchlorate eutectic.

The 33:67 mixture of diepoxides of Example 3 is mixed at room temperature with 23 parts of trimethylenediamine and then 369 parts of the lithium perchlorate/ammonium perchlorate eutectic. The mixture is now heated at 85° C. for seventy hours. The product is a hard coherent mass which appears homogeneous to the naked eye and burns well.

A similar product is obtained when N,N-dimethylacetamide is included as plasticizer.

EXAMPLE 5

This example illustrates the preparation of another polymeric solid solution of the perchlorate eutectic.

A mixture is prepared of 33 parts of limonene diepoxide and 67 parts of the bis(epoxydicyclopentyl) ether of ethylene glycol, and the mixture is heated before 26 parts of trimethylene diamine are added. After mixing, 378 parts of lithium perchlorate/ammonium perchlorate eutectic is introduced, and heating at 85° C. is continued. After 48 hours cure is complete, and the product is a solid solution of the perchlorate which burns very well.

EXAMPLE 6

This example illustrates preparation of a plasticized polymeric solid solution of perchlorate.

A mixture of 498 parts of the ethylene glycol ether diepoxide identified above, 103 parts of trimethylene diamine and 150 parts of N,N-dimethylacetamide dissolves 2994 parts of lithium perchlorate/ammonium perchlorate eutectic to provide a hard though brittle polymer on heating at 85° C.

In another run, the mixture is proportioned:

| | Parts |
|---|---|
| Diepoxide | 373 |
| Trimethylenediamine | 77 |
| N,N-dimethylacetamide | 300 |
| Lithium perchlorate/ammonium perchlorate eutectic | 2875 |

Curing at 85° C. for 65 hours gives a tough polymer which burns very well.

EXAMPLE 7

This example illustrates preparation of a polyacrylamide solid solution of the lithium perchlorate/ammonium perchlorate eutectic including sodium azide as an additive in the composition.

15 parts of acrylamide, 6 parts of ethylene glycol, 4 parts of sodium azide and 5 parts of lithium perchlorate/ammonium perchlorate eutectic heated at 85° C. proceed smoothly in less than an hour form a solid solution polymer with excellent tensile, elongation, and burning rate properties.

EXAMPLE 8

The procedure of the above examples is followed, combining monomeric acrylamide with ethylene glycol and the perchlorate eutectic, and heating at 85° C. until polymer formation is obtained. In this case, the mix includes atomized aluminum, and is proportioned to produce the composition stated below. Properties of the polymeric product are measured and computed as stated below:

| | | | |
|---|---|---|---|
| Composition by weight, percent: | | | |
| Polyacrylamide | | | 15 |
| Ethylene glycol | | | 10 |
| $LiClO_4/NH_4ClO_4$ | | | 49.91 |
| Aluminum | | | 25.09 |
| Specific impulse (computed), lb.-sec./lb. | | | 249 |
| Effective specific impulse | | | 245 |
| Density (measured), g./cc. (0.0683 lb./in.³) | | | 1.89° |

| | −40° C. | 23° C. (73° F.) | 60° C. |
|---|---|---|---|
| Ultimate tensile strength, p.s.i | 650 | 96 | 17.5 |
| Ultimate tensile elongation, percent | 4.7 | 434 | 700 |
| Modulus (2% secant) p.s.i | | 200 | 3 |
| Five second autoignition temperature, °C | | 403 | |
| Strand burning rate (5µ aluminum), in./sec. at 1,000 p.s.i | | 0.74 | |
| Pressure exponent of burning | | 0.97 | |
| Impact sensitivity (50% probability, 2 kg. weight), cm | | 23 | |
| Minimum height for detonation, cm | | 21 | |
| Linear coefficient of thermal expansion (−20° C. to 0° C.), in./in.° C | | 0.96×10⁻⁴ | |
| Cubical coefficient of thermal expansion (−20° C. to 0° C.), in.³/in.³/° C | | 2.88×10⁻⁴ | |
| Viscosity of uncured propellant, cp. at 75° C | | 9,000 | |

While the invention has been illustrated with reference to various specific preferred embodiments thereof it is to be appreciated that modifications and variations can be made without departing from the scope of the invention which is limited only as defined in the appended claims.

What is claimed is:

1. A polymeric solid solution of an oxidant amount of the lithium perchlorate/ammonium perchlorate eutectic and the polymer of a monomer including a hetero atom selected from the group consisting of O, S and N, in the same homogeneous phase.

2. A propellant composition comprising the product of claim 1, said composition including at least sufficient oxidant to make combustion of said system self-supporting.

3. The composition of claim 1 wherein said homogeneous phase additionally includes plasticizer for said polymer having solvent power for said perchlorate eutectic.

4. The composition of claim 3 wherein said polymer is polyacrylamide and said plasticizer is ethylene glycol.

5. The composition of claim 1 wherein said polymer is a polyurea.

6. The composition of claim 1 wherein said polymer is a poly beta hydroxy amine.

7. The composition of claim 1 wherein said polymer is characterized by the inclusion of amidic groups as bonds linking recurrent repetitive units.

8. The composition of claim 1 wherein said polymer is the addition polymer of an olefinic monomer characterized by including a donor atom selected from the group consisting of O, S, and N bonded to reduce carbon.

9. The method of forming a polymeric solid solution of the lithium perchlorate/ammonium perchlorate eutectic wherein said perchlorate eutectic and polymer are in the same homogeneous phase which comprises polymerizing a polymerizable monomer including a hetero atom selected from the group consisting of O, S, and N in the presence of dissolved lithium perchlorate/ammonium perchlorate eutectic.

10. The method of claim 9 wherein said eutectic is dissolved in oxidant amount.

11. The method of preparing a polymeric solid solution of lithium perchlorate/ammonium perchlorate eutectic and polymer in the same homogeneous phase which comprises addition polymerization of an olefinic monomer including a hetero atom selected from the group consisting of O, S and N, in the presence of dissolved lithium perchlorate/ammonium perchlorate eutectic.

12. The method of forming a polymeric solid solution of lithium perchlorate/ammonium perchlorate eutectic and polymer in the same homogeneous phase which comprises polymerizing an active hydrogen polyfunctional monomer with a second polyfunctional monomer reactive therewith to form a polymer, at least one of said monomers including a hetero atom selected from the group consisting of O, S and N, in the presence of dissolved lithium perchlorate/ammonium perchlorate eutectic.

13. The method of preparing a polymeric solid solution of the lithium perchlorate/ammonium perchlorate eutectic and polymer in the same homogeneous phase which comprises self-condensation of a polymerizable monomer including a hetero atom selected from the group consisting of O, S and N, in the presence of dissolved lithium perchlorate/ammonium perchlorate eutectic.

14. The method of claim 11 wherein said olefinic monomer is an acrylamide.

15. The method of claim 14 wherein said acrylamide is acrylamide of the formula $CH_2{:}CHCONH_2$.

16. The method of claim 12 wherein said polymerizable active hydrogen polyfunctional monomer is a diamine.

17. The method of claim 16 wherein said diamine is polymerized by a polyisocyanate.

18. The method of claim 16 wherein said diamine is polymerized by a polyepoxide.

19. The method of claim 13 wherein said polymerizable monomer is a diisocyanate, polymerizable to a polyisocyanurate.

References Cited

UNITED STATES PATENTS

| | | | |
|---|---|---|---|
| 3,054,702 | 9/1962 | Stengle et al. | 149—19 |
| 3,003,310 | 10/1961 | D'Alelio | 149—83X |
| 3,000,713 | 9/1961 | Gold | 149—19 |
| 2,992,908 | 7/1961 | Hedrick et al. | 149—83X |

BENJAMIN R. PADGETT, Primary Examiner

U.S. Cl. X.R.

149—19, 20, 83